| United States Patent [19] | [11] | 4,247,412 |
|---|---|---|
| Ohno et al. | [45] | Jan. 27, 1981 |

[54] BLOWING COMPOSITION

[75] Inventors: Shigeaki Ohno, Naruto; Nobuyuki Aburatani, Tokushima; Nobuyuki Ueda, Naruto, all of Japan

[73] Assignee: Otsuka Kagaku Yakuhin Kabushiki Kaisha, Japan

[21] Appl. No.: 30,943

[22] Filed: Apr. 17, 1979

[51] Int. Cl.³ ............................................. C09K 3/00
[52] U.S. Cl. ............................ 252/350; 264/DIG. 5; 521/90; 521/95; 521/96; 521/92; 521/97; 521/143; 521/146; 521/150; 521/909; 521/910
[58] Field of Search .................. 252/350; 521/96, 910, 521/73, 143, 92, 909, 90; 264/DIG. 5

[56] References Cited

U.S. PATENT DOCUMENTS

| 2,804,435 | 8/1957 | Reed | 521/910 |
|---|---|---|---|
| 3,197,423 | 7/1965 | Ackerman | 521/73 |
| 3,278,466 | 10/1966 | Crour et al. | 521/73 |
| 3,293,094 | 12/1966 | Narin et al. | 521/73 |
| 3,340,209 | 9/1967 | Riley, Jr. et al. | 521/73 |
| 3,502,754 | 3/1970 | Fehn | 521/910 |
| 3,645,930 | 2/1972 | Normanton et al. | 521/143 |
| 3,966,651 | 6/1976 | Kleiner et al. | 521/910 |

FOREIGN PATENT DOCUMENTS 3297877 8/1977 Japan .

*Primary Examiner*—Morton Foelak
*Attorney, Agent, or Firm*—Armstrong, Nikaido, Marmelstein & Kubovcik

[57] ABSTRACT

A blowing composition comprising azodicarbonamide, a zinc peroxide and a decomposition inhibitor for azodicarbonamide.

6 Claims, No Drawings

BLOWING COMPOSITION

This invention relates to a blowing composition, and more particularly to a blowing composition containing azodicarbonamide.

Azodicarbonamide is widely used as a blowing agent for preparing foamed products of various polymers. Azodicarbonamide is not hazardous, is decomposable to give off a large quantity of gas with a nontoxic odorless residue producing no pollutant when decomposed, and is therefore very advantageous over other organic blowing agents. However, since azodicarbonamide decomposes at a high temperature of about 200° C., the compound, when used for foaming polymers comprising polyvinyl chloride, polyethylene or the like as a base material, entails the drawback that the polymer becomes thermally degraded or scorched owing to decomposition temperature of azodicarbonamide which is out of coincidence with the softening point of the base material. For this reason, it has been attempted to add a decomposition accelerator to azodicarbonamide to thereby render the amide decomposable at a lower temperature and at the highest possible velocity. Examples of useful decomposition accelerators are zinc oxide, metal salts of fatty acids and urea compounds. To be sure, these decomposition accelerators render azodicarbonamide decomposable at lower temperatures but are unable to freely adjust the decomposition temperature or velocity to any desired value. This leads to the drawback that azodicarbonamide is partially decomposed during kneading or extrusion prior to the foaming treatment, possibly making it difficult to obtain a foamed product of uniform cells or eventually resulting in a reduced blowing degree. Additionally the conjoint use of the decomposition accelerator will impede brisk decomposition of azodicarbonamide, or cause clogging, or corrosion of the die used for extrusion foaming step.

We conducted continued research in an attempt to develop decomposition accelerators which are free of the foregoing drawbacks and discovered that zinc peroxides are useful as such accelerators and leave only a greatly reduced amount of residue when decomposed. Based on this discovery, we accomplished the invention disclosed in Japanese Patent Application No. 37480/1975 (Published Examined Japanese Patent Application No. 32978/1977). The invention provides a blowing composition which is composed of azodicarbonamide and a zinc peroxide and which is usable almost free of the above-mentioned drawbacks. The blowing composition nevertheless still has the disadvantage that part of the azodicarbonamide decomposes in the initial stage of kneading or extrusion (hereinafter referred to as "initial stage decomposition").

On the other hand, inhibitors are known for inhibiting the decomposition of azodicarbonamide. Such inhibitors have the drawback of reducing the overall decomposition velocity of the blowing agent without permitting brisk decomposition, consequently necessitating a prolonged foaming time. The inhibitors have another drawback in that part of azodicarbonamide is not fully decomposed which causes a yellow color in the foamed product obtained.

An object of this invention is to provide a blowing composition which comprises azodicarbonamide and a zinc peroxide in combination and which is usable without initial-stage decomposition.

Another object of this invention is to provide a blowing composition which comprises azodicarbonamide and a zinc peroxide in combination and which is decomposable without producing any residue of the amide.

Another object of this invention is to provide a blowing composition which comprises azodicarbonamide and a zinc peroxide in combination and which is decomposable at a high velocity.

Another object of this invention is to provide a blowing composition which comprises azodicarbonamide and a zinc peroxide in combination and which is decomposable briskly. These and other objects and features of the present invention will become apparent from the following description.

The objects of this invention can be fulfilled by incorporating a decomposition inhibitor into blowing compositions comprising azodicarbonamide and a zinc peroxide.

Our research has revealed that when a blowing composition comprising azodicarbonamide and a zinc peroxide further incorporates an agent for inhibiting the decomposition of azodicarbonamide, the initial-stage decomposition only of the azodicarbonamide can be inhibited very effectively without impairing the foaming characteristics of the composition composed of the amide and peroxide to any extent and also without entailing any of the foregoing drawbacks attributable to the use of the decomposition inhibitor. This invention has been accomplished based on this finding. Stated more specifically, the present invention has the following features. The conjoint use of azodicarbonamide, zinc peroxide and decomposition inhibitor permits the azodicarbonamide to decompose briskly and fully and produce a gas effectively without impairing the foaming properties of the amide despite the use of the inhibitor. The inhibitor can inhibit the initial-stage decomposition of the amide sufficiently. These features, namely brisk decomposition, full decomposition and inhibition of the initial-stage decomposition, provide a foamed product with minute cells in compact arrangement, result in a shortened foaming time and achieve a foaming degree at least twice as high as is conventionally attainable. The increased foaming degree leads to a reduction in the quantity of azodicarbonamide needed and therefore to a cost reduction.

The zinc peroxides useful in this invention are represented by the formula $$Zn_lO_m \cdot (H_2O)_{n/2} \qquad (I)$$

wherein l is an integer of 1 to 10, m is an integer of 2 to 20, m is larger than l and n is 0 or an integer of 1 to 8. Examples of such compounds are $ZnO_2$, $Zn_2O_3$, $Zn_3O_5$, etc. The zinc peroxide is used in an amount of about 0.1 to about 2 parts by weight, preferably about 0.2 to about 1 part by weight, per part by weight of azodicarbonamide.

The decomposition inhibitors useful in this invention are a wide variety of compounds known as decomposition inhibitors for azodicarbonamide, such as acid hydrazides, and various organic acids or anhydrides thereof. Examples of useful acids for acid hydrazides are maleic acid, phthalic acid, citric acid, adipic acid, itaconic acid, malic acid, oxalic acid, benzoic acid, among which maleic acid, oxalic acid and itaconic acid are preferable. Examples of useful acid hydrazides are oxalic acid hydrazide, maleic acid hydrazide, etc. Exemplary of useful organic acids are itaconic acid, maleic acid, malic acid, citric acid, adipic acid, fumaric acid, trimellitic acid or anhydride thereof, 1,2-phthalic acid, anthranilic acid, oxalic acid, 2,6-dihydroxybenzoic acid, isosebacid acid, barbituric acid, etc. Also usable are triazole compounds such as 3-amino-1,2,4-triazole. The decomposition inhibitor is used in an amount of about 0.1 to about 1 part by weight, preferably about 0.2 to about 0.5 part by weight, per part by weight of the zinc peroxide. If less than about 0.1 part by weight of the inhibitor is used, azodicarbonamide is decomposed in the initial-stage, whereas when more than about 1 part by weight of the inhibitor is present, there arises the tendency that the blowing composition fails to produce satisfactorily foamed products, hence undesirable.

The polymers for which the blowing compositions of this invention are usable are those having a softening point of 50° to 200° C., preferably 80° to 170° C. Examples of useful polymers are vinyl chloride type polymers such as polyvinyl chloride, vinyl chloride-vinyl acetate copolymer and vinyl chloride-ethylene copolymer; styrene type polymers such as polystyrene, styrene-acrylonitrile copolymer, styrene-butadiene copolymer and styrene-butadiene-acrylonitrile copolymer; olefin type polymers such as polyethylene, polypropylene, ethylene-propylene copolymer, polyisobutylene, polybutadiene, ethylene-vinyl acetate copolymer and butadiene-acrylonitrile copolymer; and rubbers such as nitrile rubber, butyl rubber, isoprene rubber, chloroprene rubber, butadiene rubber and natural rubber.

The polymers to be foamed with the blowing composition of this invention are preferably cross-linkable or curable polymers for the following reasons. When polymers which are inherently are not cross-linkable or curable are to be made into a foamed product, the polymer must be maintained at such a viscosity that it is capable of maintaining the gas evolved from the blowing agent therein and withstanding the pressure of the gas. This imposes a limitation on the amount of the blowing agent usable and accordingly on the foaming degree achievable. In the case of cross-linkable or curable polymers, cross-linking or curing reaction gives the polymer sufficient strength to withstand the amount and pressure of the evolved gas. This permits the use of an increased amount of the blowing agent, which in turn effects a higher degree of foaming. However for the preparation of highly foamed products from cross-linkable or curable polymers with use of conventional blowing agents, there is need to heat the polymer at a high temperature for a prolonged period of time in addition to the necessity of using a large amount of the blowing agent so as to assure sufficient foaming. The product therefore becomes invariably costly and can not be prepared efficiently. Such cross-linkable or curable polymers nevertheless can be foamed to a high degree with heating at a usual temperature for a usual period of time when the blowing composition of this invention is used in a usual amount. There is no need to use an especially increased amount of the composition. Examples of useful cross-linkable or curable polymers are polymers or copolymers which are cross-linkable with a cross-linking agent or radiation, or polymers or copolymers which are curable with a curing agent. More specific examples are polyethylene, ethylene-vinylacetate copolymer, nitrile rubber and chloroprene rubber. Examples of suitable cross-linking agents and curing agents are a wide variety of those heretofore used, including cross-linking agents such as dicumylperoxide, 2,5-dimethyl-2,5-di(ter-butyl-peroxy)-hexane, ter-butyl-cumylperoxide, and curing agents such as sulfur, sulfur chloride, sulfur dichloride, morpholine disulfide, magnesium oxide, zinc oxide, etc.

When desired, various additives can be admixed with the blowing compositions of this invention for the preparation of foamed products. Exemplary of useful additives are plasticizers, lubricants, fillers, extenders, pigments and antioxidants. More specific examples are dioctyl phthalate (DOP), dibutyl phthalate (DBP), butyl benzyl phthalate (BBP), dehydrierungspolymerisat (DHP), dioctyl adipate (DOA), phthalic acid and like plasticizers; lubricants such as calcium stearate, zinc stearate and like metal salts of fatty acids, and oleylamide and like amides; 3,5-ditertiary-butyl-4-hydroxytoluene, dilaurylthio propionate, 2,6-ditertiary-butyl phenol, N-di-β-naphthyl-p-phenylenediamine and like antioxidants; calcium carbonate, talc, clay, aluminum hydroxide, aluminum silicate, magnesium silicate, glass fiber and like fillers. These additives are used in amounts conventional in the art.

Foamed products are prepared with the blowing composition of this invention in the usual manner. For example, the blowing composition is kneaded with a polymer, and the kneaded mixture is molded by a suitable method as by pressure molding, die molding, paste molding, calendar molding, extrusion molding or injection molding. The mixture is heated for foaming simultaneously with or after molding. The blowing composition is used in an amount of about 1 to about 40 parts by weight, preferably about 5 to about 20 parts by weight, per 100 parts by weight of the polymer. For foaming, the mixture is heated usually at 120° to 200° C., preferably 140° to 180° C.

The present invention will be described below in greater detail with reference to examples and comparison examples, in which the parts are all by weight.

EXAMPLES 1 AND 2, AND COMPARISON EXAMPLES 1 TO 3

One part of azodicarbonamide and specified amount of the decomposition accelerator and decomposition inhibitor listed in Table 1 below are mixed together to prepare a blowing composition. The quantity of gas evolved from the composition at 220° C. is measured by gas chromatography. The result is shown in Table 2.

TABLE 1

| Component (part) | Example | | Comparison Example | | |
|---|---|---|---|---|---|
| | 1 | 2 | 1 | 2 | 3 |
| Decomposition accelerator | | | | | |
| Zinc oxide | — | — | 0.5 | 0.5 | — |
| Zinc peroxide | 0.5 | 0.5 | — | — | 0.5 |
| Decomposition inhibitor | | | | | |
| Trimellitic acid | 0.1 | — | — | 0.1 | — |
| 3-Amino-1,2,4-triazole | — | 0.1 | — | — | — |

TABLE 2

| | Example | | Comparison Example | | | Reference |
|---|---|---|---|---|---|---|
| | 1 | 2 | 1 | 2 | 3 | Example* |
| Total quantity gas (cc/g) | 450 | 447 | 272 | 255 | 450 | 241 |

*Azodicarbonamide alone is used in Reference Example.

EXAMPLES 3 AND 4, AND COMPARISON EXAMPLES 4 TO 6

One part of azodicarbonamide and specified amounts of the compounds listed in Table 3 below are dispersed in 20 ml of DOP in a test tube connected to a gas burette. The mixture is heated at a constant temperature of 180° C. to determine a decomposition gas evolution curve.

TABLE 3

| Components (part) | Example | | Comparison Example | | |
|---|---|---|---|---|---|
| | 3 | 4 | 4 | 5 | 6 |
| Zinc oxide | — | — | 0.5 | 0.5 | — |
| Zinc peroxide | 0.5 | 0.5 | — | — | 0.5 |
| Oxalic acid hydrazide | 0.1 | — | — | 0.1 | — |
| Trimellitic acid | — | 0.1 | — | — | — |

EXAMPLE 5 AND COMPARISON EXAMPLE 7

One hundred parts of EVA (trade mark: "ULTRATHENE UE630," product of TOYO SODA CO. LTD., Japan), 1 part of dicumyl peroxide (trade mark: "PERCUMYL-D," product of NIPPON OIL AND FAT CO. LTD., Japan), 3 parts of azodicarbonamide (trade mark: "UNIFORM-AZH-25," product of Otsuka, Japan), 1.5 parts of zinc peroxide and 0.2 part of trimellitic anhydride are kneaded together by mixing rolls at 135° to 140° C. and made into a sheet. The sheet is then heated for decomposition in a die under a pressure of 100 kg/cm$^2$ at 160° C. for 7 to 15 minute, and withdrawn from the die after slowly releasing the pressure from the die. Table 4 shows the specific gravity of the decomposed product. For comparison, the same procedure as above is repeated except that in place of zinc peroxide, the same amount of zinc oxide is used.

TABLE 4

| | Heating time (min) | | | | | |
|---|---|---|---|---|---|---|
| | 7 | 8 | 9 | 10 | 12 | 15 |
| Example 5 (g/cm$^3$) | 0.074 | 0.069 | 0.068 | 0.067 | 0.067 | 0.070 |
| Comparison Example 7 (g/cm$^3$) | 0.096 | 0.108 | 0.112 | 0.120 | 0.125 | 0.128 |

EXAMPLES 6 TO 8, AND COMPARISON EXAMPLES 8 TO 11

To 100 parts of finely divided low-density polyethylene (M.I.=7.0) are added 5 parts of azodicarbonamide, 1 part of dicumyl peroxide and specified amounts of the compounds listed in Table 5 below, and the ingredients are mixed together to obtain a foamable polymer composition.

The composition is made into an unfoamed sheet, 2.5 mm in thickness and 70 mm in width, with use of an extruder having a die of 25 mm in outlet diameter and driven at 80 r.p.m. The extruder is heated at a temperature of about 110° C. to about 120° C. The sheet is heated for foaming in a gear oven at 220° C. for 6 minutes to obtain a cross-linked foamed sheet. The same procedure is repeated for each example as shown in Table 5. Table 6 shows the characteristics of the unformed sheets and foamed sheets thus prepared. Azodicarbonamide alone is used in Reference Example.

TABLE 5

| Ingredient (part) | Example | | | Comp. Ex. | | | |
|---|---|---|---|---|---|---|---|
| | 6 | 7 | 8 | 8 | 9 | 10 | 11 |
| Zinc oxide | — | — | — | 2.5 | 2.5 | 2.5 | — |
| Zinc peroxide | 2.5 | 2.5 | 2.5 | — | — | — | 2.5 |
| Trimellitic anhydride | 0.3 | — | — | — | 0.3 | — | — |
| Oxalic acid hydrazide | — | 0.3 | — | — | — | — | — |
| 3-Amino-1,2,4-triazole | — | — | 0.3 | — | — | 0.3 | — |

TABLE 6

| | | Unfoamed sheet | Foamed sheet | |
|---|---|---|---|---|
| | | Initial-stage decomposition | Foaming degree (times) | State |
| Ex. | 6 | No | 9.8 | White uniform cells |
| | 7 | No | 10.3 | White uniform cells |
| | 8 | No | 11.5 | Slightly brown uniform cells |
| Comp.Ex. | 8 | Some | 6.1 | Disturbed cells |
| | 9 | No | 5.7 | Slightly yellow but acceptable cells |
| | 10 | No | 5.2 | Good cells |
| | 11 | Yes | 10.0 | Markedly distrubed cells |
| Ref.Ex. | | No | 3.4 | Residue of yellowish white undecomposed substance found |

EXAMPLE 9 AND COMPARISON EXAMPLE 12

To 50 parts of SBR ("NIPOR 1502," product of Japan Geon Co. Ltd.), are added 50 parts of high-styrene rubber ("HYCAR-2057SS," product of Japan Geon Co. Ltd.), 70 parts of calcium carbonate, 30 parts of silica, 5 parts of zinc oxide, 10 parts of cumaron resin, 4 parts of azodicarbonamide, 2.5 parts of sulfur and 0.3 parts of a curing accelerator ("ACCEL-TMT," product of Kawaguchi Chemical Co. Ltd., Japan) 2.0 parts of a curing accelerator ("ACCEL-C7," product of Kawaguchi Chemical Co. Ltd., Japan and the specified amount of the compounds shown in Table 7, and the mixture is kneaded at a temperature of 120° to 125° C. by mixing rolls and made into a sheet. The sheet then cured at 130° to 135° C. for 30 to 40 minutes to produce a foamed product. Table 8 shows the characteristic of the foamed products.

TABLE 7

| | Example 9 | Comp. Ex. 12 |
|---|---|---|
| Zinc peroxide | 2.0 | — |
| Zinc oxide | — | 2.0 |
| Trimellitic acid | 0.3 | 0.3 |

TABLE 8

| | Example 9 | Comp. Ex. 12 |
|---|---|---|
| Specific gravity (g/cm$^3$) | 0.21 | 0.29 |

EXAMPLE 10 AND COMPARISON EXAMPLE 13

100 parts of ABS ("DENLA-ABS, GR-2000," product of DENKI CHEMICAL INDUSTRY Co. Ltd., Japan), 0.3 part of calcium stearate, 0.35 part of azodicarbonamide and the specified amount of compounds shown in Table 9 below are mixed and the mixture is then extruded at 150° to 168° C. Table 10 shows the characteristic of extrudates thus obtained.

TABLE 9

| | Example 10 | Comp. Ex. 13 |
|---|---|---|
| Zinc peroxide | 0.15 | — |
| Zinc oxide | — | 0.15 |
| Trimellitic acid | 0.03 | 0.03 |

TABLE 10

|  | Example 10 | Comp. Ex. 13 |
|---|---|---|
| Foaming degree | 2.5 | 2.1 |

We claim:

1. A blowing composition comprising azodicarbonamide, a zinc peroxide and a decomposition inhibitor for azodicarbonamide selected from the group consisting of an acid hydrazide, an organic acid, an organic acid anhydride and a triazole.

2. The blowing composition according to claim 1 which comprises one part by weight of azodicarbonamide, about 0.1 to about 2 parts by weight of zinc peroxide per part by weight of azodicarbonamide and about 0.1 to about 1 part by weight of the decomposition inhibitor per part by weight of the zinc peroxide.

3. The blowing composition according to claim 2 which comprises one part by weight of azodicarbonamide, about 0.2 to about 1 part by weight of zinc peroxide per part by weight of azodicarbonamide and 0.2 to 0.5 part by weight of the decomposition inhibitor per part by weight of the zinc peroxide.

4. The blowing composition according to claim 1 in which the zinc peroxide is at least one compounds represented by the formula $$Zn_l O_m \cdot (H_2O)_{n/2}$$

wherein l is an integer of 1 to 10, m is an integer of 2 to 20, m is larger than l and n is 0 or an integer of 1 to 8.

5. The blowing composition according to claim 4 in which the zinc peroxide is at least one species selected from the group consisting of $ZnO_2$, $Zn_2O_3$ and $Zn_3O_5$.

6. A blowing composition comprising azodicarbonamide, a zinc peroxide, and a decomposition inhibitor for the azodicarbonamide selected from the group consisting of: (a) a hydrazide of malic acid, phthalic acid, citric acid, adipic acid, itaconic acid, malic acid, oxalic acid, bezoic acid, or maleic acid; (b) an acid or an anhydride of an acid selected from the group consisting of itaconic acid, maleic acid, malic acid, citric acid, adipic acid, fumaric acid, trimellitic acid, and o-phthalic acid; (c) anthranillic acid, oxalic acid, 2,6-dihydroxybenzoic acid, isosebacic acid or barbituric acid; and (d) 3-amino-1,2,4-triazole.

* * * * *